United States Patent [19]

Dinerman et al.

[11] Patent Number: 5,044,926
[45] Date of Patent: Sep. 3, 1991

[54] ANTI-BACKFLOW VALVE FOR INJECTION MOLDING MACHINES

[75] Inventors: Alex Dinerman; James E. O'Bryan, both of Cincinnati, Ohio

[73] Assignee: Cincinnati Milacron Inc., Cincinnati, Ohio

[21] Appl. No.: 542,988

[22] Filed: Jun. 25, 1990

[51] Int. Cl.$^5$ ............................................. B29C 45/52
[52] U.S. Cl. ................................ 425/562; 264/328.12; 425/563
[58] Field of Search ..................... 425/562, 563, 564; 264/328.12

[56] References Cited

U.S. PATENT DOCUMENTS

| | | | |
|---|---|---|---|
| 3,007,202 | 11/1961 | Wucher | 425/562 |
| 3,319,299 | 5/1967 | Kiraly | 425/564 |
| 3,550,208 | 12/1970 | Peters | 424/67 |
| 3,888,393 | 6/1975 | Drori | 222/229 |
| 4,349,044 | 9/1982 | Schirmer | 137/512.3 |
| 4,377,180 | 3/1983 | Biljes | 137/528 |
| 4,477,242 | 10/1984 | Eichlseder et al. | 425/562 |
| 4,498,860 | 2/1985 | Gahan | 425/562 |
| 4,512,733 | 4/1985 | Eichlseder et al. | 425/562 |
| 4,582,224 | 4/1986 | Proksa et al. | 425/562 |
| 4,643,665 | 2/1987 | Zeiger | 425/563 |
| 4,850,851 | 7/1989 | Dinerman | 425/562 |
| 4,954,073 | 9/1990 | Oriez et al. | 425/562 |

FOREIGN PATENT DOCUMENTS

| | | |
|---|---|---|
| 2515530 | 10/1976 | Fed. Rep. of Germany . |
| 2635144 | 2/1978 | Fed. Rep. of Germany . |
| 3101196 | 9/1982 | Fed. Rep. of Germany . |
| 2363429 | 5/1978 | France . |
| 2028216 | 3/1980 | United Kingdom . |

Primary Examiner—Timothy Heitbrink
Attorney, Agent, or Firm—Nies, Kurz, Bergert & Tamburro

[57] ABSTRACT

An anti-backflow valve for mounting on the forward end of a plasticating screw rotatably and translatably carried in a tubular barrel of an injection molding machine. The valve includes a rod-like body member that extends forwardly of the plasticating screw for rotation relative to the screw and for axial translation relative to the screw for a limited distance. A retaining sleeve is threadedly secured to the forward end of the screw to define a forward stop to limit axial outward movement of the body member relative to the screw. The outer surface of the retaining sleeve includes a valve seat that is engagable with a sealing surface on a screw tip that is carried at the forward end of the body member. The screw tip includes flow passageways extending substantially axially therethrough to provide communication between the space ahead of the screw and an area behind the screw tip and between the screw body and the screw-receiving tubular barrel. At least one sealing ring is carried by the body member and the retaining sleeve to prevent flow of plasticated material therebetween. The ability of the body member to rotate relative to the screw avoids breakage of the screw tip during a cold start-up condition when solidified plastic material from a previous operation of the machine surrounds the screw tip.

17 Claims, 1 Drawing Sheet

ANTI-BACKFLOW VALVE FOR INJECTION MOLDING MACHINES

BACKGROUND OF THE INVENTION

1. Field of the Invention

This invention relates to the injection system of an injection molding machine. More particularly, the present invention relates to an anti-backflow valve positioned at the forward end of a plasticating screw to prevent backflow of plasticated material into the screw flights of plasticated material ahead of the screw upon forward axial movement of the screw to effect injection of the plasticated material into a mold cavity.

2. Description of the Related Art

In plastic molding machines utilizing a plasticating screw to convey polymeric material through a heated barrel so that it undergoes softening, becomes plasticated, and is capable of flowing, the screw is rotated to carry plasticated material along the screw to its forward end. As plasticated material accumulates ahead of the screw, the screw is permitted to move axially rearwardly until a predetermined volume of plasticated material has been accumulated ahead of the screw. At that point rotation of the screw is terminated, and the screw is caused to travel axially forward toward an outlet in the barrel, to thereby force the plasticated material through the outlet and inject it into an adjacent mold cavity, whereupon a part of predetermined configuration can be formed upon cooling of the material in the mold cavity.

During the injection step, while the plasticating screw is moving axially toward the outlet of the barrel, it is necessary that backflow of plasticated material from the space ahead of the screw into the screw flights be prevented, so that the desired predetermined quantity of plasticated material is completely injected into the mold cavity in order to form a complete molded part.

Various types of non-return or anti-backflow valve structures carried on the forward end of a plasticating screw have been devised over the years, and examples of commonly used valve structures are illustrated and described in U.S. Pat. No. 4,377,180, which issued on Mar. 22, 1983, to William H. Biljes, and U.S. Pat. No. 4,477,242, which issued on Oct. 16, 1984, to Martin Eichlseder et al. The non-return valves illustrated and described in those patents each include an annular sealing ring that is slidable a limited distance in the direction of the screw axis. When the screw is rotating and is plasticating material, the annular ring is in a forward-most position, and plasticated material is permitted to flow from the forward flights of the screw through the center portion of the ring. When axial movement of the screw toward the barrel outlet commences, the annular sealing ring slides rearwardly, relative to the screw, and contacts a cooperating sealing surface on the axially moving screw to close off the flow path between the screw flights and the screw tip, and thereby permit injection into a mold of a desired portion of the volume of plasticated material that has been accumulated ahead of the forward end of the screw. However, both the Biljes and Eichlseder et al. structures, which are similar to a number of other non-return valve constructions, each include a screw tip around which the annular ring is carried, and that tip is firmly secured to the forward end of and rotates with the screw. It has been found that at times when the machine is first started, and plastic material in solidified form is present within the barrel, unless the plasticated material has been softened by heating before rotation of the screw is initiated, which involves some delay, it is possible for the tip of the screw to break because the tip is surrounded by and is tightly gripped by the cool, solid plastic material as the screw is being rotated. Additionally, because the screw tip serves as a forward stop for the annular sealing ring during plastication, and because there is relative rotational movement between the screw tip and the sealing ring, both the screw tip and the sealing ring are required to be made from hard, wear-resistant materials in order to avoid the need for frequent replacement of those parts because of wear.

One form of anti-backflow valve that overcomes the problems of the previous-identified prior art devices is disclosed in U.S. Pat. No. 4,850,851, which issued Jul. 25, 1989, to Alex Dinerman, one of the inventors of the invention disclosed in the present application. The Dinerman '851 patent discloses an anti-backflow valve in which the screw tip is rotatable relative to the screw, to thereby overcome the screw tip breakage problem referred to above. The Dinerman valve also includes an annular slider or sealing ring that is capable of axial movement relative to the screw to provide sealing action and thereby control the flow of material through the valve.

West German Offenlegungschrift No. 2,515,530, in the name of Wilhelm Fischer, and French Patent No. 2,363,429, in the name of Marcel Manceau, each disclose anti-backflow valves that permit relative rotation between the screw and the screw tip. However, those publications do not disclose any arrangement for preventing the flow of plasticated material into the blind bore in the forward end of the screw.

It is an object of the present invention to overcome the problems attendant with the prior art anti-backflow valve constructions and to provide a valve structure that permits the use of less expensive materials.

It is a further object of the present invention to provide an anti-backflow valve in which the screw tip will not break on start-up of screw rotation if the plastic material surrounding the tip during a cold start is not sufficiently softened.

It is a still further object of the present invention to provide an anti-backflow valve that includes fewer parts and that is therefore less expensive to manufacture.

It is another object of the present invention to provide an anti-backflow valve that does not permit the flow of plasticated material into the forward end of the screw that receives the screw tip.

Other objects and advantages of the present invention will become apparent from the ensuing description.

SUMMARY OF THE INVENTION

Briefly stated, and in accordance with one aspect of the present invention, an anti-backflow valve is provided for positioning on a forward end of a plasticating screw that is rotatably carried in a tubular barrel. The valve includes a body that extends outwardly from the forward end of the plasticating screw, the body being rotatable and translatable relative to the screw while the screw is rotating to plasticate polymeric material. The body includes a forward end and a back end. A retainer is provided at the forward end of the screw to surround the body and for providing a forward stop for limiting forward axial translation of the body relative to the screw. The retaining means includes a valve seat facing in a forward direction relative to the screw. A sealing ring is provided between the body and the retainer to prevent the flow therebetween of plasticated material.

A screw tip having an outer diameter sufficient to prevent flow of plasticated material between the screw tip and the tubular barrel is carried by the forward end of the body. The screw tip includes a valve surface facing and engagable with the valve seat for selectively opening and closing a plasticated material flow path between the screw and the screw tip.

DESCRIPTION OF THE PREFERRED EMBODIMENTS

Figure 1:
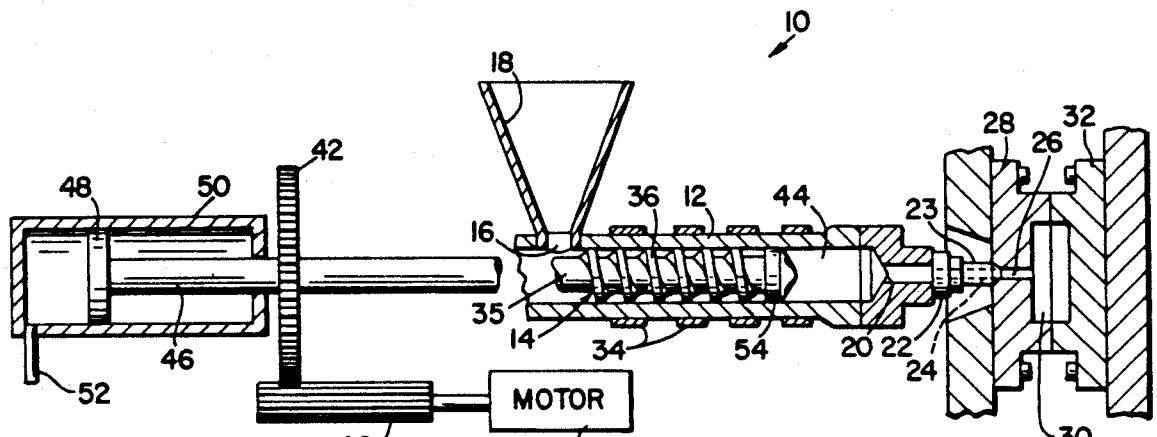
FIG. 1 is a fragmentary, schematic, cross-sectional view showing a portion of the injection system of a screw-type injection molding machine including a plasticating screw that incorporates at the forward end of the screw an anti-backflow valve in accordance with the present invention.

Referring now to the drawings, and particularly to FIG. 1 thereof, there is shown a portion of the plastication and injection section of a reciprocating screw injection molding machine 10. The machine includes a tubular barrel 12 within which a plasticating screw 14 is rotatably and axially slidably received.

Tubular barrel 12 includes a material inlet 16, and an upwardly extending, cone-shaped hopper 18 for receiving particles of polymeric material to be plasticated. Barrel 12 also includes an outlet 20, to which an outlet flow control valve 22 and a nozzle 23 are connected. The nozzle includes a through passageway 24 that is in communication with a sprue or conduit 26 provided in one half 28 of a mold defined by a pair of cooperating, separable mold halves 28 and 32. The mold halves when placed together as shown in FIG. 1 define a mold cavity 30, which is in fluid communication with barrel 12 through barrel outlet 20, outlet nozzle 22, and sprue 26 when nozzle 22 is open.

A plurality of circumferentially positioned band heaters 34 are provided in axially spaced relationship on the outer surface of barrel 12 to heat and maintain the barrel at a predetermined temperature in order to assist in softening the solid, incoming polymeric material and to cause it to become molten within the barrel for injection into mold cavity 30. Although an external source of heat in the form of resistance band heaters is shown, it will be apparent to those skilled in the art that other forms of external heat sources can also be employed, if desired.

Plasticating screw 14 includes a generally cylindrical or conical body 35, around the outer periphery of which one or more helical screw flights 36 are provided. When rotated, screw 14 carries the particles of solid polymeric material from barrel inlet 16 toward barrel outlet 20. During transit between those points within the barrel, the solid particles are softened, both by the heat generated as a result of the mechanical working action of plasticating screw 14 on the particles, as well as by the external heat supplied by band heaters 34, to become a viscous fluid that can be injected into the mold cavity. Screw 14 is rotated by a suitable motor 38 through a gear train 40, 42.

As the plasticated material is conveyed to the forward portion of the screw, toward barrel outlet 20, the softened, viscous material accumulates in volume 44 at the forward end of barrel 12, and as the volume of accumulated material increases, screw 14 is gradually pushed toward the left, as viewed in FIG. 1, away from barrel outlet 20, at which nozzle shut-off valve 22 is positioned, and which is then in the closed condition to retain plasticated material within volume 44.

The rearmost end 46 of screw 14 includes a piston 48 that is slidably received within a cylinder 50. Hydraulic pressure is maintained on the rear face of piston 48 through conduit 52, to maintain a back pressure on the material as it is being accumulated in volume 44.

The softened plasticated material passes forwardly along the screw and then flows from the screw flights through an anti-backflow valve 54 positioned at the forward end of the screw, and into volume 44 at the forward end of barrel 12. When the desired quantity of plasticated material has been accumulated ahead of the screw, a quantity normally designated as a "shot," the rotation of the screw is stopped. High pressure hydraulic fluid is then introduced through conduit 52 into cylinder 50 against the rear face of piston 48. When nozzle shut-off valve 22 is opened, the pressure against piston 48 moves screw 14 to the right, as viewed in FIG. 1, to cause anti-backflow valve 54 to close and thereby permit screw 14 to move in a forward direction and push the shot of plasticated material within volume 44 through barrel outlet 20, nozzle shut-off valve 22, nozzle 23, sprue 26, and into mold cavity 30. Pressure is maintained on the plasticated material in the mold cavity until the material within the mold has cooled sufficiently so that it is in a substantially hardened condition. Thereupon nozzle shut-off valve 22 is again closed, the screw is again rotated to accumulate another shot, and the cycle is successively repeated to provide successive molded parts.

Figure 2:
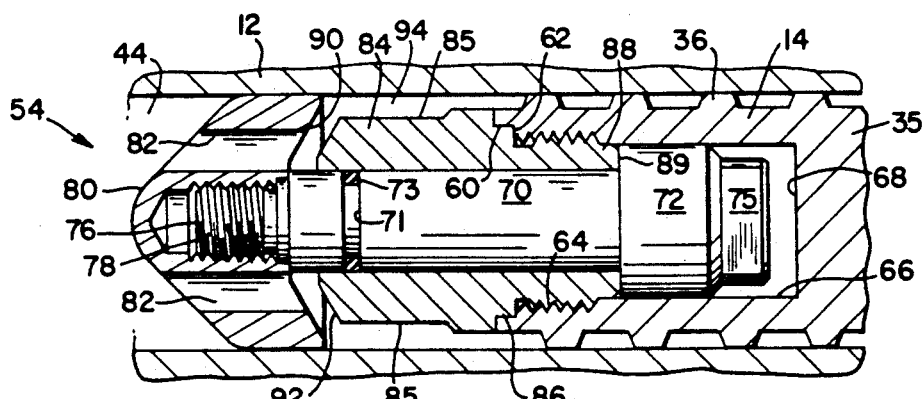
FIG. 2 is an enlarged, fragmentary, cross-sectional view of the forward end of the plasticating screw illustrated in FIG. 1, showing the anti-backflow valve in the open position to permit flow of plasticated material therethrough from the screw flights into the space ahead of the screw tip.
Figure 3:
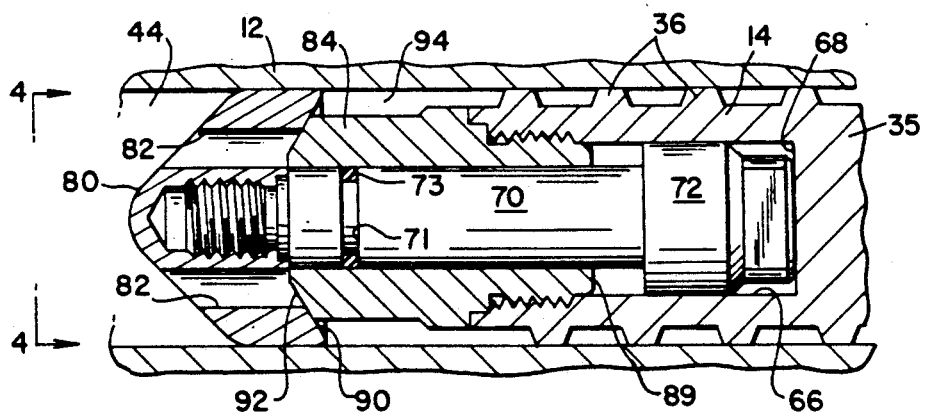
FIG. 3 is an enlarged, fragmentary, cross-sectional view similar to that of FIG. 2, showing the anti-backflow valve in the closed position to prevent flow of plasticated material therethrough.

Referring now to FIGS. 2 and 3, screw 14 is shown with its forwardmost end within barrel 12. In FIG. 2 anti-backflow valve 54 is in its open condition and in FIG. 3 it is closed. The forward end of screw 14 includes an opening 60 that terminates at an inner annular shoulder 62. Axially inwardly of shoulder 62 is an internally threaded cylindrical surface 64 that is of smaller diameter than that of opening 60 and is coaxial with the screw axis and with opening 60. A counterbore 66 extends axially inwardly of threaded cylindrical surface 64 and terminates at an inner transverse end 68.

Figure 4:
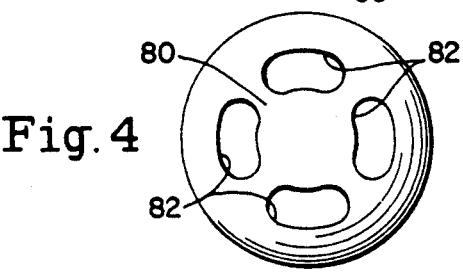
FIG. 4 is an end view of the screw tip of the plasticating screw of the machine illustrated in FIGS. 1 through 3, taken along the line 4—4 of FIG. 3.

A body member in the form of a cylindrical stud or rod 70 includes an innermost enlarged cylindrical end 72 that is rotatably and axially slidably received in and has a shorter axial length than counterbore 66. The outer diameter of end 72 and the inner diameter of counterbore 66 are so selected as to permit relative rotation and relative translation therebetween without binding. A reduced diameter forward end portion 76 of rod 70 extends outwardly beyond the forwardmost end of screw 14 and includes an external thread 78 that receives a generally conically configured screw tip 80. A front view of screw tip 80 is shown in FIG. 4, from which it can be sen that screw tip 80 includes four arcuate, axially extending passageways 82 that pass completely through screw tip 80 to provide a flow path for fluid materials.

Referring once again to FIG. 2, an annular retaining sleeve 84 is threadedly received at threaded portion 64 of opening 60 at the forwardmost end of screw 14. Retaining sleeve 84 surrounds and rotatably and axially slidably receives rod 70 and includes an inner shoulder 86 that abuts shoulder 62 in screw 14 to limit inward movement of retaining sleeve 84 relative to screw 14. Retaining sleeve 84 also includes an inner end 88 that defines an annular stop face 89 to act against cylindrical end 72 of rod 70 to limit outward movement of rod 70 in an axial direction relative to screw 14. Again, the connections between the parts are such that the rod 70 is capable of translation and rotation relative to retaining sleeve 84.

Rod 70 includes an annular peripheral groove or recess 71 that is axially positioned on rod 70 so that groove 71 is always inside retaining sleeve 84, regardless of the axial position of rod 70. A sealing ring 73 is carried in groove 71 to act similar to a piston ring by preventing the flow of plasticated material between rod 70 and the inner bore of retaining ring 84 and into counterbore 66. Preferably, sealing ring 73 is a metallic ring that can have a substantially rectangular cross section and can be made from stainless steel, or from another material capable of withstanding temperatures of the order of about 800° F. or so.

Screw tip 80 has an outer diameter substantially the same as the inner diameter of barrel 12 to prevent flow of plasticated material therebetween, but also to permit screw tip 80 to slide axially within barrel 12 as the screw moves either forwardly or rearwardly. Screw tip 80 also includes a rearwardly facing sealing surface 90 that is of annular, substantially frustoconical configuration and is inclined relative to the axis of screw 14. Sealing surface 90 is positioned radially outwardly of passageways 82, and the latter are intended to be the only flow paths between the flights of screw 14 and volume 44 ahead of the screw. Sealing surface 90 is adapted to engage with a corresponding frustoconical sealing surface 92 formed on the forward face of retaining sleeve 84 to prevent flow therebetween when the two sealing surfaces are in contacting relationship.

Cylindrical end 72 of rod 70 includes a pair of flat surfaces 75 spaced 180° apart for receiving a wrench to facilitate assembly of screw tip 80 to rod 70. Similarly, retaining sleeve 84 includes a pair of flat surfaces 85 spaced 180° apart for receiving a wrench to facilitate assembly of retaining sleeve 84 to the forward end of screw 14.

As can be seen in FIG. 2, plasticated material can be carried forwardly along screw 14 by flights 36 (in a direction from right to left as viewed in FIG. 2) to an annular passageway 94 defined by the inner surface of barrel 12 and the radially outermost surface of retaining sleeve 84. Thereupon, the forwardly moving plasticated material acts against sealing surface 90 and urges screw tip 80 in a forward direction, relative to screw 14, until cylindrical end 72 of rod 70 abuts annular stop face 89 of retaining sleeve 84. The material then flows from passageway 94, past sealing surfaces 90 and 92, and then through passageways 82 in screw tip 80 to volume 44 ahead of the screw tip.

Because of the connections and fit between the respective parts as earlier described, if an injection molding machine that includes the present anti-backflow valve structure were to be started in a cold start condition, in which solidified polymeric material from a previous operating period surrounds screw tip 80 and has not been sufficiently softened, breakage of the screw tip is avoided because the tip can remain stationary by virtue of the relative rotation permitted between rod 70 and plasticating screw 14.

FIG. 3 shows the positions of the parts during the injection step, when screw tip 80 is in contact with retaining sleeve 84 so that sealing surfaces 90 and 92 are in contacting and sealing engagement to prevent flow between screw tip 82 and retaining sleeve 84. That sealing engagement condition is brought about by forward axial movement of screw 14 toward the left, as viewed in FIGS. 2 and 3. The resulting contact between the screw tip and the retaining sleeve seals off annular passageway 94 around the periphery of the retaining sleeve from plasticated material collection area 44 ahead of screw tip 80. Consequently, continued leftward movement of screw 14 relative to barrel 12 will cause the accumulated plasticated material ahead of the screw tip to be injected into the mold cavity without any backflow of the material in collection area 44 through anti-backflow valve 54 and into the screw flight area.

It will thus be apparent that the present invention provides an improved anti-backflow valve that can be fabricated from relatively inexpensive materials, because of fewer wear surface areas between the respective parts of the valve structure, as compared with previously-used valves, and it also provides a valve having fewer parts and a screw tip that can be held stationary relative to the screw without breakage during a cold startup of the machine.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. Injection molding apparatus comprising:
   a) a tubular barrel having an inner surface, the barrel including a material inlet and a material outlet spaced axially from the material inlet;
   b) a plasticating screw rotatably and slidably supported in the barrel for plasticating polymeric material and for conveying polymeric material within the barrel from the material inlet to the material outlet, the screw including a forward end facing toward the material outlet;
   c) flow control means carried by the plasticating screw at a forward end of the screw for controlling flow of plasticated polymeric material from the screw toward the material outlet, the flow control means including body means extending outwardly from the forward end of the screw said body means being rotationally and translationally movable relative to the screw while the screw is rotating to plasticate polymeric material, the body means having a forward end and a back end, retainer means carried by the forward end of the screw and surrounding the body means for retaining the body means, the retainer means including stop means for limiting forward axial translational movement of the body means relative to the screw and including valve seat means facing in a forward direction relative to the screw for defining a first valve surface, sealing means positioned between the body means and the retainer means to prevent flow of plasticated material therebetween, the sealing means including an annular metallic sealing ring, and a screw tip carried by the forward end of the body means, the screw tip having a longitudinal axis and including a second valve surface facing and engagable with the first valve surface for selectively opening and closing a plasticated material flow path between the screw and the screw tip, the screw tip having an outer diameter sufficient to prevent flow of plasticated material between the screw tip and the tubular barrel, and the screw tip including passageway means for permitting flow of plasticated material from the screw through the flow control means to an area forward of the screw when the second valve surface is spaced from the first valve surface.

2. Injection molding apparatus in accordance with claim 1, wherein the screw tip passageway means includes a plurality of longitudinally extending flow paths through the screw tip to define a plurality of openings facing the screw, the openings each positioned radially inwardly of the second valve surface.

3. Injection molding apparatus in accordance with claim 2, wherein the flow paths in the screw tip are substantially equidistantly spaced about the longitudinal axis of the screw tip.

4. Injection molding apparatus in accordance with claim 3, wherein the flow paths are arc-shaped in transverse cross section.

5. Injection molding apparatus in accordance with claim 1, wherein the valve seat means includes an annular sealing surface.

6. Injection molding apparatus in accordance with claim 5, wherein the screw has a longitudinal axis and the annular sealing surface is inclined relative to the screw axis.

7. Injection molding apparatus in accordance with claim 1, wherein the sealing ring has a substantially rectangular cross section.

8. Injection molding apparatus in accordance with claim 1, wherein the sealing ring is carried in an annular recess on the body means.

9. Injection molding apparatus comprising:
a) a tubular barrel having an inner surface, the barrel including a material inlet and a material outlet spaced axially from the material inlet;
b) a plasticating screw rotatably and slidably supported in the barrel for plasticating polymeric material and for conveying polymeric material within the barrel from the material inlet to the material outlet, the screw including a forward end facing toward the material outlet;
c) anti-backflow valve means carried at the forward end of the screw for permitting flow of plasticated material only in a direction toward and past the forward end of the screw and for preventing backflow of plasticated material into the screw from the forward end thereof, the valve means including a valve seat carried by the screw for rotation therewith, the valve seat including a first sealing surface, and closure means slidably engaging the barrel inner surface and movable toward and away from the valve seat for selectively preventing and permitting flow through the valve means, the closure means including rod means extending form the closure means toward the forward end of the screw for rotational movement and axial translational movement of the rod means relative to an axial bore in the valve seat, sealing means positioned between the axial bore in the valve seat and the rod means for preventing the flow of plasticated material into the axial bore, the sealing means including an annular metallic sealing ring, the closure means including a second sealing surface engagable with the first sealing surface for sealing engagement therewith to prevent flow of plasticated material past the valve means, the closure means including passageway means positioned downstream of the second sealing surface to permit flow of plasticated material through the closure means when the second sealing surface is spaced from the first sealing surface, to selectively permit flow of plasticated material through the valve means.

10. Injection molding apparatus in accordance with claim 9, wherein the closure means includes a body member that is rotatably and axially translatably received in a bore at the forward end of the screw, and the screw includes retaining means for rotatably and axially translatably retaining the body member relative to the screw.

11. Injection molding apparatus in accordance with claim 10, wherein the body member includes an enlarged end rotatably and axially translatably received within the forward end of the screw.

12. Injection molding apparatus in accordance with claim 9, wherein the valve seat means is frustoconical.

13. Injection molding apparatus in accordance with claim 9, the valve surface means is frustoconical.

14. Injection molding apparatus in accordance with claim 10, wherein the body member includes an enlarged end portion for engagement with the retainer means carried by the screw for limiting forward movement of the body member relative to the screw, the end portion having a smaller axial length than the axial length of the bore with the retaining means in position, to permit limited axial movement of the body member relative to the screw.

15. Injection molding apparatus in accordance with claim 9, wherein the sealing means has a substantially rectangular cross section.

16. Injection molding apparatus in accordance with claim 9, wherein the sealing ring is carried in an annular recess in the rod means.

17. An anti-backflow valve for the forward end of a plasticating screw, the screw adapted to be rotatably and axially slidably carried in a barrel, said valve comprising:
a) body means adapted to extend outwardly from the forward end of the screw and rotatable and axially translatably relative to the screw while the screw is rotating to plasticate polymeric material, the body means including a forward end and a back end;
b) retainer means adapted to be secured to the forward end of the screw and surrounding a portion of the body means, the retainer means defining a forward stop for limiting forward axial translation of the body means relative to the screw, and valve seat means for defining a first sealing surface carried by the retainer means and facing in a forward direction relative to the screw;

c) sealing means positioned between the body means and the retainer means to prevent flow of plasticated material therebetween, the sealing means including an annular metallic sealing ring having a substantially rectangular cross section; and d) screw tip means carried by the forward end of the body means, the screw tip means including valve surface means for defining a second sealing surface facing and engagable with the first sealing surface of the valve seat means for selectively opening and closing a plasticated material flow path between the screw and a space forward of the screw, the screw tip means having an outer diameter sufficient to prevent flow of plasticated material between the screw tip means and the tubular barrel and including passageway means extending longitudinally through the screw tip means and defining an opening facing the screw, the opening positioned radially inwardly of the valve surface means for permitting flow of plasticated material from the screw through the valve to the space forward of the screw when the valve surface means is spaced from the valve seat means.

* * * * *